United States Patent [19]

Härtel et al.

[11] Patent Number: 5,213,315
[45] Date of Patent: May 25, 1993

[54] METHOD FOR VARYING THE SPRING RIGIDITY OF AN ELASTOMER MOUNT, AND A CORRESPONDING MOUNT

[75] Inventors: Volker Härtel, Germering; Matthias Richter, Inning; Mathias Gugsch, München, all of Fed. Rep. of Germany

[73] Assignee: Metzeler Gimetall AG, Munich, Fed. Rep. of Germany

[21] Appl. No.: 777,634

[22] Filed: Oct. 15, 1991

[30] Foreign Application Priority Data

Oct. 12, 1990 [DE] Fed. Rep. of Germany ....... 4032504
Aug. 29, 1991 [DE] Fed. Rep. of Germany ....... 4128761

[51] Int. Cl.$^5$ ............................................... F16F 3/08
[52] U.S. Cl. ................... 267/292; 267/140.11; 267/140.15; 267/153
[58] Field of Search ............... 267/35, 140.1, 140.13, 267/140.14, 219, 140.2, 141, 153, 292, 294, 140.15, 152, 258, 141.1; 248/562, 636; 180/300, 312

[56] References Cited

U.S. PATENT DOCUMENTS

| 3,118,659 | 1/1964 | Paulsen | 267/35 |
| 3,658,314 | 4/1972 | Luzsicza | 248/562 X |
| 4,468,016 | 8/1984 | Pineau | 267/292 X |
| 4,717,130 | 1/1988 | Barkhage | 267/292 X |
| 4,762,309 | 8/1988 | Hutchins | 267/219 X |
| 4,790,521 | 12/1988 | Ide et al. | 267/219 |

FOREIGN PATENT DOCUMENTS

| 968701 | 3/1958 | Fed. Rep. of Germany | 267/292 |
| 1243032 | 6/1967 | Fed. Rep. of Germany | 267/292 |
| 0149436 | 11/1980 | Japan | 267/140.1 A |
| 94145 | 6/1982 | Japan | 267/140.1 A |
| 80320 | 4/1987 | Japan | 267/140.1 R |
| 1310546 | 5/1987 | U.S.S.R. | 248/562 |

Primary Examiner—Robert J. Oberleitner
Assistant Examiner—Alfred Muratori
Attorney, Agent, or Firm—Herbert L. Lerner; Laurence A. Greenberg

[57] ABSTRACT

A method for varying the spring rigidity of an elastomer engine mount, such as for motor vehicles, includes bringing one of two at least intermittently simultaneously loadable parallel-connected spring bodies into continuous engagement with supports and bringing the other of the two spring bodies into intermittent contact with supports as a function of predetermined operating parameters, for absorbing induced forces in parallel with the two spring bodies. The other spring is connected in parallel with a force brought to bear separately from the outside for causing it to contact its supports. An elastic engine mount for motor vehicles includes a hollow-cylindrical spring body and a solid-cylindrical spring body disposed concentrically relative to one another between an engine mount plate and a support plate to be fixed to a vehicle body. According to one embodiment, a diaphragm is disposed between the lower end surface of the solid-cylindrical spring body and the support plate for defining a hollow chamber between the diaphragm and the support plate. The hollow chamber operatively connects the solid-cylindrical spring body with the plates upon forced introduction of hydraulic fluid into the hollow chamber. According to another embodiment, a mechanical plunger is disposed between the lower end surface of the solid-cylindrical spring body and the support plate. A threaded bolt engages the mechanical plunger. A control motor drives the threaded bolt and operatively connects the solid-cylindrical spring body with the plates.

25 Claims, 2 Drawing Sheets

METHOD FOR VARYING THE SPRING RIGIDITY OF AN ELASTOMER MOUNT, AND A CORRESPONDING MOUNT

BACKGROUND OF THE INVENTION

Field of the Invention

The invention relates to a method for varying the spring rigidity of an elastomer mount, in particular an engine mount for motor vehicles, having two rubber bodies that can be at least intermittently loaded simultaneously, and a corresponding elastic mount.

Modern engine mounts generally have the task both of absorbing the various static and dynamic engine holding forces occurring during vehicle operation and damping the resultant low-frequency engine vibrations, and of suppressing the transmission of acoustical vibrations that are propagated from the engine to the body and thus to the passenger compartment of a motor vehicle. That means that the mount must have different properties, in terms of rigidity and the loss angle of damping, in the low-frequency and high-frequency ranges. In the construction of an engine mount, that dictates major compromises, which under unfavorable conditions may be far from optimum. One possibility for lessening the incident deviations from the optimum is to use known hydraulically damped engine mounts, which effect major damping of low-frequency vibrations and simultaneously make purposeful decoupling of the high-frequency vibrations possible. However, with such mounts as well, the properties in the low and high-frequency ranges cannot be adjusted independently, so that adaptation to the various required values becomes very complicated and expensive. Moreover, such hydraulically damped engine mounts generally have a disadvantage which is that a variation in the dynamic rigidity occurs only in the axial or in other words vertical direction, while in the radial direction the rigidity remains largely unchanged. A controlled change in rigidity that is adapted to applicable operating conditions is not possible.

It is accordingly an object of the invention to provide a method for varying the spring rigidity of an elastomer mount and a corresponding mount, which overcome the hereinaforementioned disadvantages of the heretofore-known methods and devices of this general type and which, based on a pure elastomer mount, discloses a method with which the spring rigidity and damping of such a mount can be varied as a function of predetermined operating parameters, in such a way that at low rpm and therefore high vibration amplitudes, particularly when idling, such a mount is relatively soft, while at higher operating rpm it is relatively hard.

Such a mount is known in principle from British Patent No. 1 408 584, in which elastomer bodies extending in concentric rings with respect to one another having a parabolically inclined overall surface are provided with a mount plate extending approximately parallel to them, tut in which a gap between it and the rubber bodies increases steadily toward the rim. When a load is introduced, radially farther-outward rubber bodies engage the mount plate in succession, so that the rigidity of the mount is increased in stages. However, neither varying the rigidity nor individual engagement of various elastomer bodies is possible.

With the foregoing and other objects in view there is provided, in accordance with the invention, a method for varying the spring rigidity of an elastomer engine mount for motor vehicles, which comprises bringing one of two at least intermittently simultaneously loadable parallel-connected spring or rubber bodies into continuous engagement with supports for the one spring body and bringing the other of the two spring bodies into intermittent contact with supports for the other spring body as a function of predetermined operating parameters, for absorbing induced forces in parallel with the two spring bodies, and connecting the other spring body in parallel with a force brought to bear separately from the outside for causing the other spring body to contact the supports for the other spring body.

In accordance with another mode of the invention, there is provided a method which comprises selecting different hardnesses for the two spring bodies, and only intermittently bringing the spring body with the greater hardness into effective engagement.

In accordance with a further mode of the , there provided a method which comprises connecting the two spring bodies in parallel as a function of engine rpm.

In accordance with an added mode of the invention, there is provided a method which comprises bringing the force for the parallel connection to bear by means of a pressure cushion to be acted upon hydraulically.

In accordance with an additional mode of the invention, there is provided a method which comprises bringing the force for the parallel connection to bear with mechanically adjusting means.

With such a method it is accordingly possible to vary the spring rigidity of a pure rubber mount between a "soft" and a "hard" characteristic, depending on given requirements and operating parameters.

With the objects of the invention in view, there is also provided an elastic engine mount for motor vehicles, comprising an engine mount plate, a support plate to be fixed to a vehicle body, a hollow-cylindrical spring body, a solid-cylindrical spring body or block having a lower end surface, the spring bodies being disposed concentrically relative to one another between the plates, and a diaphragm disposed between the lower end surface of the solid-cylindrical spring body and the support plate for defining a hollow chamber between the diaphragm and the support plate, the hollow chamber operatively connecting the solid-cylindrical spring body with the plates upon forced introduction of hydraulic fluid into the hollow chamber.

With the objects of the invention in view, there is furthermore provided an elastic engine mount for motor vehicles, comprising an engine mount plate, a support plate to be fixed to a vehicle body, a hollow-cylindrical spring body, a solid-cylindrical spring body or block having a lower end surface, the spring bodies being disposed concentrically relative to one another between the plates, a mechanical plunger disposed between the lower end surface of the solid-cylindrical spring body and the support plate, a threaded bolt engaging the mechanical plunger, and a control motor for driving the threaded bolt and operatively connecting the solid-cylindrical spring body with the plates.

In accordance with another feature of the invention, the solid-cylindrical spring body has a shorter axial length than the hollow-cylindrical spring body.

In accordance with a further feature of the invention, the solid-cylindrical spring body has a lower end wall with an annularly protruding extension, and there is provided a sleeve being fixed on the support plate and having a drawn-in rim for engaging the extension from behind in a spaced-apart manner.

In accordance with an added feature of the invention, the extension is formed by a metal plate vulcanized on the solid-cylindrical spring body.

In accordance with still another feature of the invention, the metal plate has a lower surface covered with an elastic rubber layer.

In accordance with an additional feature of the invention, there is provided a sleeve being fixed on the support plate and having a base, the diaphragm having a periphery being fastened in a fluid-tight manner between the support plate and the base of the sleeve, and the support plate having an adjustable inlet for a hydraulic fluid.

After a fluid is forced into the hollow chamber thus formed beneath the diaphragm, the solid-cylindrical spring body is thus pressed against the drawn-in rim of the sleeve, so that a force-locking connection is established, and so both spring bodies then absorb forces induced parallel to one another. A force-locking connection is one which connects two elements together by force external to the elements, as opposed to a form-locking connection which is provided by the shapes of the elements themselves.

In accordance with yet another feature of the invention, the force generated by the pressure of the fluid is greater than the incident operating forces, in the form of the static load to be supported and the dynamic operating forces.

In accordance with yet a further feature of the invention, the hydraulic pressure is approximately 5 bar.

In accordance with yet an added feature of the invention, there is provided a cup-shaped flange plate secured beneath the support plate and centrally carrying the control motor, the threaded bolt penetrating the flange plate and the support plate, and the plunger being box-like and having a top to be forced against the solid-cylindrical spring body.

In accordance with still a further feature of the invention, the box-like plunger has an underside and two ribs protruding from the underside and penetrating guide slits formed in the support plate.

In accordance with yet an additional feature of the invention, the hollow-cylindrical spring body is disposed outside the solid-cylindrical spring body, the outer hollow-cylindrical spring body has a Shore A hardness of approximately 40, and the inner solid-cylindrical spring body has a Shore A hardness of approximately 65. This is done in order to provide an optimal ratio of spring rigidities of parallel-connected spring bodies and only one acted-upon spring body.

In accordance with again another feature of the invention, the ratio of the axial to the radial rigidity of the mount is approximately 4.5. In order to attain this rigidity ratio, in accordance with again a further feature of the invention, the hollow-cylindrical spring block can additionally be subdivided axially, approximately centrally, by a rigid intermediate ring.

In accordance with again a further feature of the invention, different radial rigidities are provided in various transverse directions, specifically by providing that at least one of the spring bodies has an elliptical outer contour.

In accordance with a concomitant feature of the invention, the a toggle lever is used instead of the plunger.

Other features which are considered as characteristic for the invention are set forth in the appended claims.

Although the invention is illustrated and described herein as embodied in a method for varying the spring rigidity of an elastomer mount and a corresponding mount, it is nevertheless not intended to be limited to the details shown, since various modifications and structural changes may be made therein without departing from the spirit of the invention and within the scope and range of equivalents of the claims. The construction and method of operation of the invention, however, together with additional objects and advantages thereof will be best understood from the following description of specific embodiments when read in connection with the accompanying drawings.

DESCRIPTION OF THE PREFERRED EMBODIMENT

Figure 1:
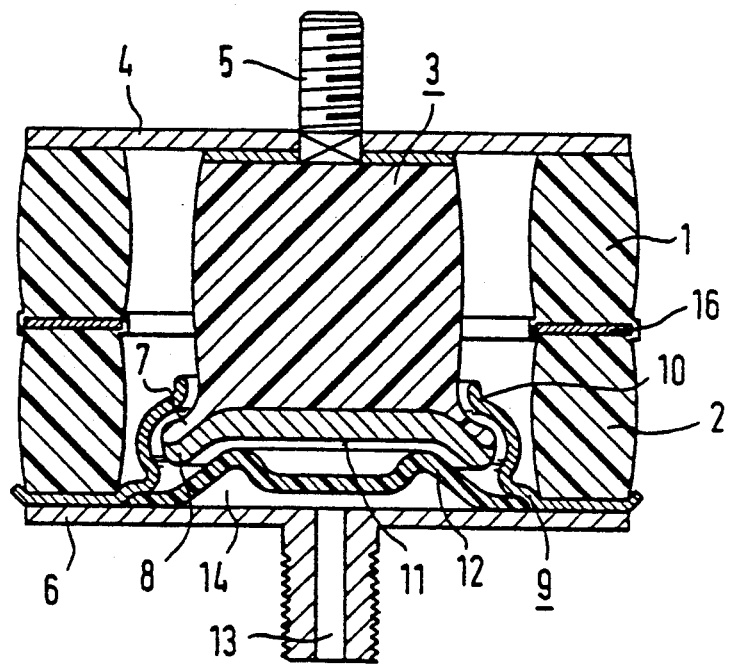
FIG. 1 is a diagrammatic, longitudinal-sectional view of an elastic mount with uncoupled spring bodies.

Referring now to the figures of the drawing in detail and first, particularly, to FIG. 1 thereof, there is seen an elastic mount which has a hollow-cylindrical spring body 1, 2, that is disposed between an engine mount plate 4 with a bolt 5 and a support plate 6 to be fixed to a vehicle body. The hollow-cylindrical spring body 1, 2 may be in one piece or, as shown in the drawing, it may be divided approximately centrally by a rigid intermediate ring 16 into two series-connected spring bodies 1 and 2, so as to enable it to adhere to a predetermined radial rigidity. Disposed inside the hollow-cylindrical spring body 1, 2 is a solid-cylindrical spring body or block 3, which is rigidly joined at its upper end to the engine mount plate 4. In the illustrated exemplary embodiment, the spring body 3 is somewhat shorter than the outer, hollow-cylindrical spring body 1, 2, and on its lower end it has an annularly protruding extension 7, which may be formed by a metal plate 8 that is vulcanized onto the spring body 3.

This extension 7 is surrounded by a sleeve 9 that is fixed to the associated support plate 6. The sleeve 9 has a drawn-in upper rim 10 which reaches behind the extension 7 in a spaced-apart manner.

A flexible, corrugated diaphragm 12 is disposed between the end surface 11 of the spring body 3 and the support plate 6. The periphery of the diaphragm 12 is fastened in a fluid-type manner between the support plate 6 and the base of the sleeve 9. The support plate 6 has an adjustable inlet 13 for a hydraulic fluid, which discharges into a hollow chamber 14 formed by the diaphragm 12 and the support plate 6.

In the exemplary embodiment shown in FIG. 1, only the outer, hollow-cylindrical spring body 1, 2 is initially in engagement with its supports provided by the elements 4 and 6, while the axial, cylindrical spring body 3 is retained on its lower end with clearance from its stop surface provided by the element 10, so that only the outer spring body 1, 2 performs elastic support, with a relatively soft characteristic curve.

Figure 2:
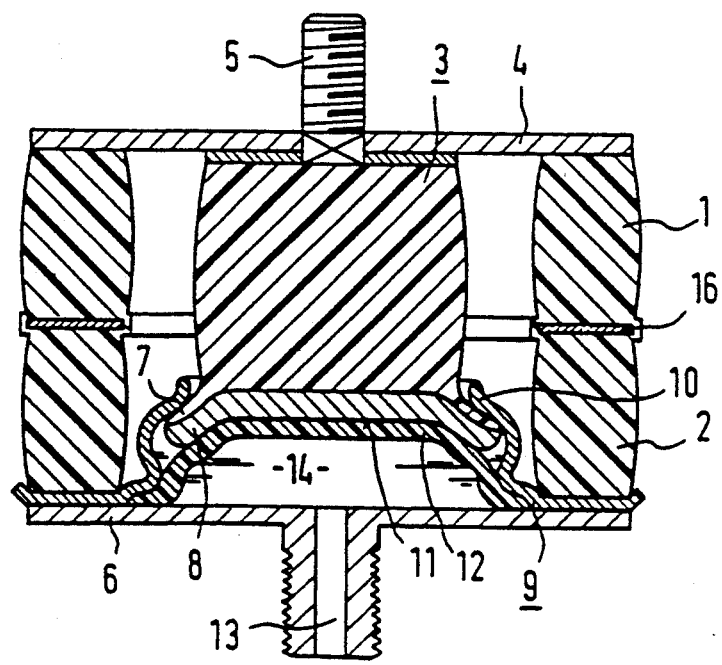
FIG. 2 is a longitudinal-sectional view of the mount with an effective parallel connection of two spring bodies by means of a hydraulic pressure cushion.

If hydraulic fluid is then forced into the hollow chamber 14 through the conduit 13, as shown in FIG. 2, the diaphragm 12 deflects, curving upward, until it comes to rest on the end surface 11 of the spring body 3 and compresses this spring body upward, or spreads apart the outer, hollow-cylindrical spring body 1, 2, thereby increasing the spacing between the plates 4 and 6, until such time as the annularly protruding extension 7 comes into contact wit h the drawn-in rim 10 of the sleeve 9, thereby establishing a force-locking coupling and causing the cylindrical spring body or block 3 to be operatively connected to the two supports 4 and 6. The result is then an effective parallel connection of the two spring bodies 1, 2 and 3, and thus a very much harder spring rigidity of the mount, with a steeper spring characteristic curve.

In order to establish a durable and stable force lock for the second spring body 3 as well, the force generated by the pressure of the fluid in the chamber 14 must be greater than the operating forces acting upon the bearing, or in other words greater than the sum of the static load and the dynamic operating forces. A pressure of approximately 5 bar should generally suffice.

Figure 3:
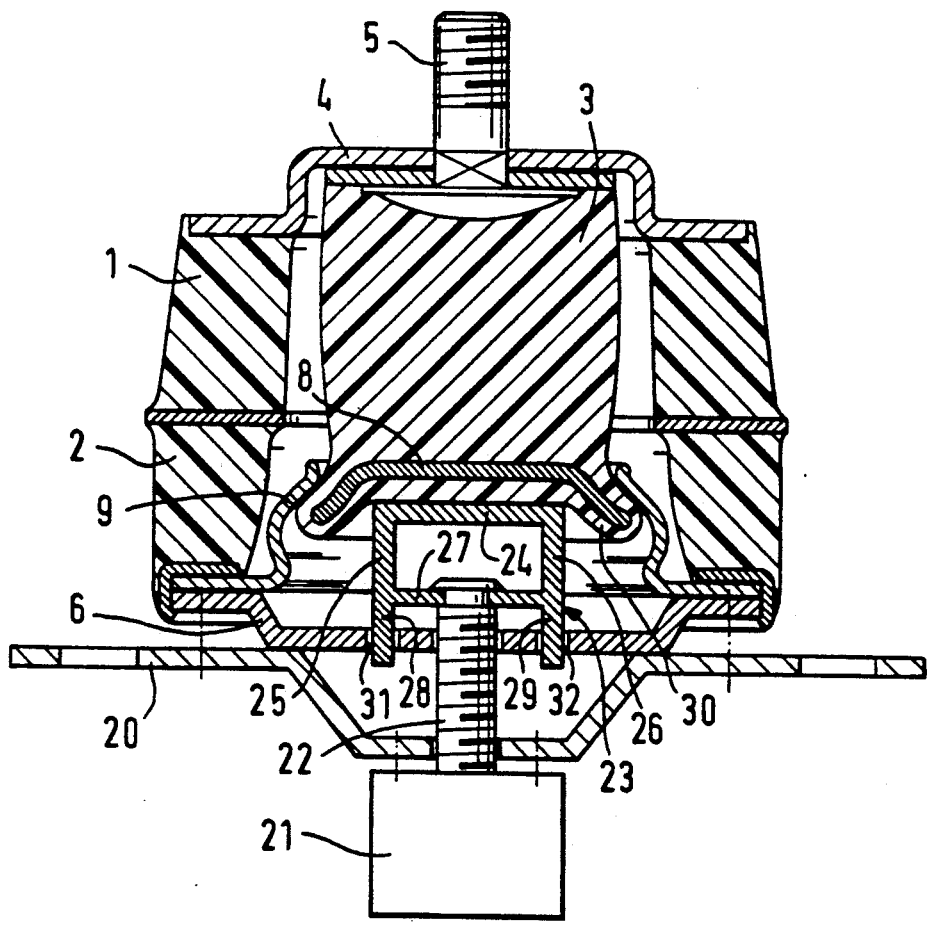
FIG. 3 is a longitudinal-sectional view of such a mount with a parallel connection by mechanical adjusting means.

FIG. 3 shows a further exemplary embodiment with the same basic structure as the engine mount of FIGS. 1 and 2, but in which the parallel connection is provided by mechanical adjusting means.

To this end, a further, cup-shaped flange plate 20 is secured below the lower support plate 6. The flange plate 20 carries a control motor 21 centrally on its lower surface. The control motor 21 may be driven electrically. This control motor 21 drives a threaded bolt 22, which centrally penetrates the flange plate 20 and the support plate 6 and is rotatably supported in both of them.

A rectangular, box-like plunger 23, which is in engagement with the threaded bolt 22, is disposed below the metal plate 8 and vulcanized onto the cylindrical spring body 3 and a rubber overlay 30 at a lower end surface thereof. The box-like plunger 23 has a horizontal top 24 which can be made to rest on the metal plate 8 and a horizontal rib 27 located between two vertical sides 25 and 26. This box-like plunger 23 also has two protruding ribs 28 and 29 on its lower surface or underside, which penetrate corresponding guide slits 31 and 32 in the support plate 6 and prevent torsion of the plunger 23.

When the control motor 21 is switched on, the plunqer 23 can thus be driven vertically, and upon striking the rubber overlay 30 of the metal plate 8 of the cylindrical spring body 3 can cause the spring body to engage its supports 4 and 6, so that the two springs 1, 2 and 3 are connected in parallel.

The mount of FIG. 3 is shown in this engaged of the parallel connection. When the plunger 23 is lowered, a spring position similar to what is shown in FIG. 1 is attained.

Furthermore, instead of the adjustment shown by means of a centrally disposed control motor, this control motor may also be laterally disposed and may act upon the threaded bolt 22 through an angle drive. Finally, however, instead of the adjustment shown by means of an electric control motor, it is also possible to carry out a parallel connection of the two springs by means of a simple toggle lever, although this is not shown in detail herein.

In terms of the structure of the spring bodies, it is suitable if the outer, hollow-cylindrical spring body 1, 2 has a Shore A hardness of approximately 40 and the inner, cylindrical spring body or block has a Shore A hardness of approximately 65.

The triggering of such a mount and the selective parallel connection are suitably effected as a function of the engine rpm and optionally other operating parameters. Thus with the embodiment of a pure rubber bearing as described, it is possible, for instance at low rpm during idling, to attain a soft characteristic curve of the mount, while at operating rpm and during travel of the vehicle, a harder characteristic curve can be attained by connecting the inner, cylindrical spring body 3 parallel to the hollow-cylindrical spring bodies 1, 2.

A further advantage of the embodiment of this mount according to the invention is that the rigidity of the mount can be varied not only in the axial or in other words vertical direction but in the radial direction as well, since the rubber bodies have a relatively great radial clearance, which is limited only by the shear resistance of the rubber. With the embodiment described, it is possible to attain a ratio between the axial and the radial rigidity of approximately 4.5, which has proved to be particularly favorable for supporting and mounting an engine as desired.

Additionally, however, it is also possible to equip the mount with different radial rigidities in various transverse directions. To this end, at least one of the spring bodies should have an elliptical outer contour as seen in a plan view. However, it is also possible to vary the radial rigidity purposefully through the use of a purposeful disposition and distribution of hollow chambers in the rubber bodies.

The overall result is accordingly a pure rubber bearing in which the spring rigidity is varied by simple means, and an adjustment from a soft to a hard characteristic curve and vice versa can be made.

We claim:

1. A method for varying a spring rigidity of an elastomer engine mount for motor vehicles, which comprises bringing one of two at lest intermittently simultaneously loadable parallel-connected spring bodies into continuous engagement with supports for the one spring body and bringing the other of the two spring bodies into intermittent contact with supports for the other spring body as a function of predetermined operating parameters, for absorbing induced forces in parallel with the two spring bodies, and connecting the other spring body in parallel with an outside force introduced separately from the induced forces for causing the other spring body to contact supports for the other spring body.

2. The method according to claim 1, which comprises selecting different hardnesses for the two spring bodies, and intermittently bringing the spring body with the greater hardness into engagement with its support.

3. The method according to claim 1, which comprises introducing the force for a parallel connection by means of a pressure cushion to be acted upon hydraulically.

4. The method according to claim 1, which comprises introducing the force for a parallel connection with mechanically adjusting means.

5. An elastic engine mount for motor vehicles comprising an engine mount plate, a support plate to be fixed to a vehicle body, a hollow-cylindrical spring body, a solid-cylindrical spring body having a lower end surface, said spring bodies being disposed concentrically relative to one another between said plates, and a diaphragm disposed between said lower end surface of said solid-cylindrical spring body and said support plate for defining a hollow chamber between said diaphragm and said support plate, said hollow chamber operatively connecting said solid-cylindrical spring body with said plates upon forced introduction of hydraulic fluid into said hollow chamber.

6. The engine mount according to claim 5, wherein said solid-cylindrical spring body has a shorter axial length than said hollow-cylindrical spring body.

7. The elastic mount according to claim 5, wherein said solid-cylindrical spring body has a lower end wall with an annularly protruding extension, and including a sleeve being fixed on said support plate and having a drawn-in rim for engaging said extension in a spaced-apart manner.

8. The elastic mount according to claim 7, wherein said extension is formed by a metal plate vulcanized on said solid-cylindrical spring body.

9. The elastic mount according to claim 5, wherein pressure due to the introduction of hydraulic fluid into said hollow chamber generates a force being greater than incident operating forces, the incident operating forces being in the form of a load to be statically supported and dynamic operating forces.

10. The elastic mount according to claim 9, wherein the hydraulic pressure is approximately 5 bar.

11. The elastic mount according to claim 5, wherein said hollow-cylindrical spring body is disposed outside said solid-cylindrical spring body, said outer hollow-cylindrical spring body has a Shore A hardness of approximately 40, and said inner solid-cylindrical spring body has a Shore A hardness of approximately 65.

12. The elastic mount according to claim 11, wherein the mount has a ratio of axial to radial rigidity of approximately 4.5.

13. The elastic mount according to claim 12, wherein the mount has different radial rigidities in various transverse directions.

14. An elastic engine mount for motor vehicles, comprising an engine mount plate, a support plate to be fixed to a vehicle body, a hollow-cylindrical spring body, a solid-cylindrical spring body having a lower end surface, said spring bodies being disposed concentrically relative to one another between said plates, a mechanical plunger disposed between said lower end surface of said solid-cylindrical spring body and said support plate, a threaded bolt engaging said mechanical plunger, and a control motor for driving said threaded bolt and operatively connecting said solid-cylindrical spring body with said plates.

15. The engine mount according to claim 14, wherein said solid-cylindrical spring body has a shorter axial length than said hollow-cylindrical spring body.

16. The elastic mount according to claim 14, wherein said solid-cylindrical spring body has a lower end wall with an annularly protruding extension, and including a sleeve being fixed on said support plate and having a drawn-in rim for engaging said extension in a spaced-apart manner.

17. The elastic mount according to claim 16, wherein said extension is formed by a metal plate vulcanized on said solid-cylindrical spring body.

18. The elastic mount according to claim 17, wherein said metal plate has a lower surface covered with an elastic rubber layer.

19. The elastic mount according to claim 14, including a cup-shaped flange plate secured beneath said support plate and centrally carrying said control motor, said threaded bolt penetrating said flange plate and said support plate, and said plunger being box-like and having a top to be forced against said solid-cylindrical spring body.

20. The elastic mount according to claim 19, wherein said box-like plunger has an underside and two ribs protruding from said underside and penetrating guide slits formed in said support plate.

21. The elastic mount according to claim 14, wherein said hollow-cylindrical spring body is disposed outside said solid-cylindrical spring body, said outer hollow-cylindrical spring body has a Shore A hardness of approximately 40, and said inner solid-cylindrical spring body has a Shore A hardness of approximately 65.

22. The elastic mount according to claim 21, wherein the mount has a ratio of axial to radial rigidity of approximately 4.5.

23. The elastic mount according to claim 22, wherein the mount has different radial rigidities in various transverse directions.

24. An elastic mount, comprising a mount plate, a support plate, a hollow-cylindrical spring body, a solid-cylindrical spring body having a lower end surface, said spring bodies being disposed concentrically relative to one another between said plates, and a diaphragm disposed between said lower end surface of said solid-cylindrical spring body and said support plate for defining a hollow chamber between said diaphragm and said support plate, said hollow chamber operatively connecting said solid-cylindrical spring body with said plates upon forced introduction of hydraulic fluid into said hollow chamber.

25. An elastic mount, comprising a mount plate, a support plate, a hollow-cylindrical spring body, a solid-cylindrical spring body having a lower end surface, said spring bodies being disposed concentrically relative to one another between said plates, a mechanical plunger disposed between said lower end surface of said solid-cylindrical spring body and said support plate, a threaded bolt engaging said mechanical plunger, and a control motor for driving said threaded bolt and operatively connecting said solid-cylindrical spring body with said plates.

* * * * *